United States Patent [19]

Miwa

[11] Patent Number: 4,570,051
[45] Date of Patent: Feb. 11, 1986

[54] ENCLOSING A GAS IN A NUCLEAR REACTOR FUEL ROD

[75] Inventor: Nobuo Miwa, Tokai Mura, Japan

[73] Assignee: Mitsubishi Nuclear Fuel Co. Ltd., Tokyo, Japan

[21] Appl. No.: 449,108

[22] Filed: Dec. 13, 1982

[30] Foreign Application Priority Data

Dec. 28, 1981 [JP] Japan ................ 56-215088

[51] Int. Cl.⁴ ............................................ B23K 9/225
[52] U.S. Cl. .............................. 219/137 R; 29/400 N; 141/4; 219/61; 376/451
[58] Field of Search ............... 219/137 R, 59.1, 60 R, 219/61; 376/451; 29/400 N; 141/66, 4, 51

[56] References Cited

U.S. PATENT DOCUMENTS

| | | | |
|---|---|---|---|
| 2,417,361 | 3/1947 | Herzog | 141/66 |
| 2,435,747 | 2/1948 | Larson | 141/66 |
| 3,677,894 | 7/1972 | Ferrari | 376/451 |
| 3,683,148 | 8/1972 | Boyko et al. | 219/137 R |
| 3,683,974 | 8/1972 | Stewart et al. | 141/4 |
| 3,842,238 | 10/1974 | Boyko et al. | 219/137 R |

FOREIGN PATENT DOCUMENTS 129792 11/1978 Japan .

*Primary Examiner*—Roy N. Envall, Jr.
*Assistant Examiner*—Alfred S. Keve
*Attorney, Agent, or Firm*—D. E. Erickson

[57] ABSTRACT

A method and system for enclosing a gas at a preselected pressure in a nuclear reactor fuel rod having two ends open to its interior. Hermetically enclose each end in a separate airtight chamber. Introduce the gas into the first chamber and open the second chamber to purge the fuel rod interior and both chambers of residual atmosphere. After purging close the open second chamber and determine the gas pressure in the fuel rod interior. When the pressure reaches the preselected value, hermetically seal each fuel rod end while in its respective chamber. After sealing, remove the fuel rod from the chambers.

6 Claims, 1 Drawing Figure

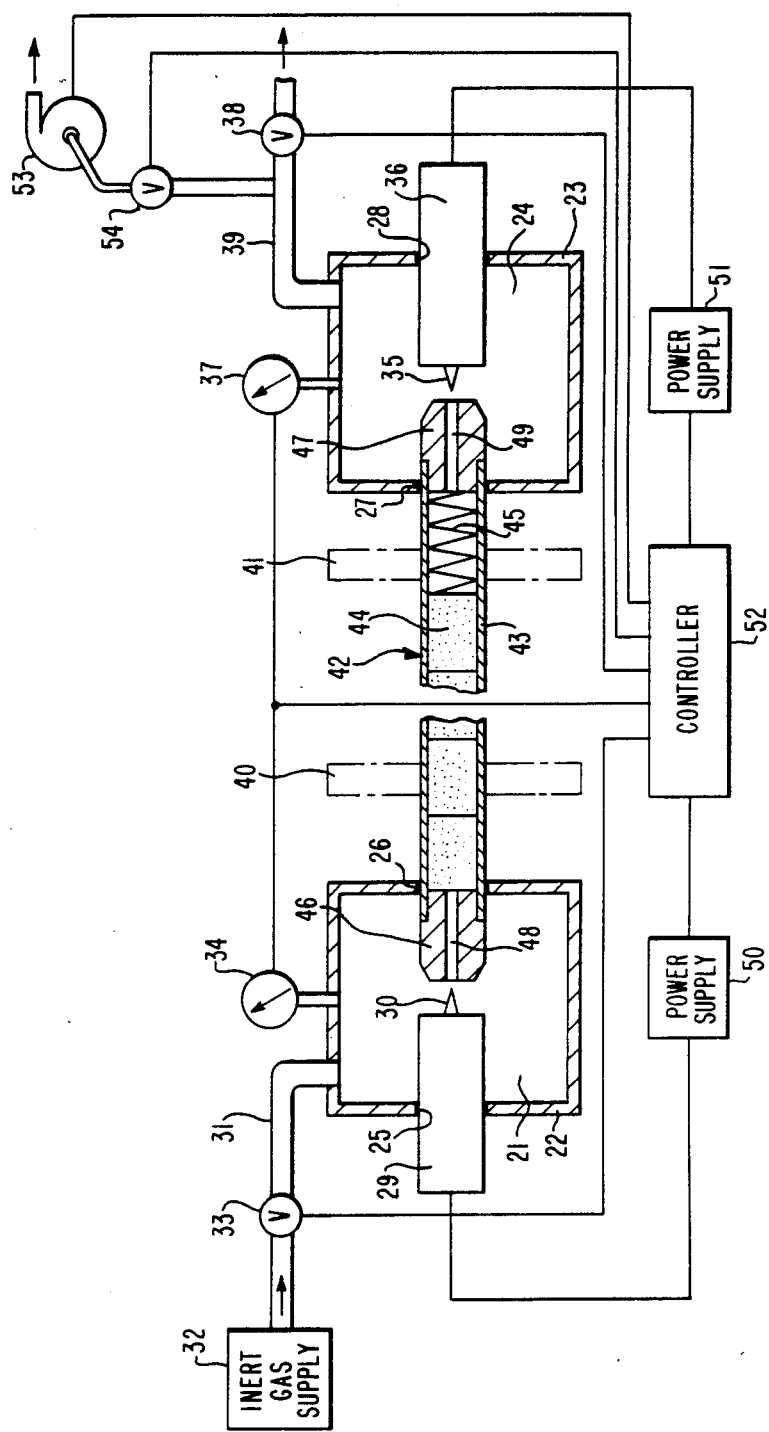

ENCLOSING A GAS IN A NUCLEAR REACTOR FUEL ROD

BACKGROUND OF THE INVENTION

The present invention relates generally to manufacturing nuclear reactor fuel assemblies and, more particularly, to an improved method and apparatus for enclosing a gas at a preselected pressure in the fuel rods which help make up a fuel assembly.

Conventional techniques for enclosing a pressurized inert gas in a nuclear fuel rod include sealing one end of the fuel rod, placing the open other end in a sealed chamber, evacuating or purging the sealed chamber, pressurizing the sealed chamber with inert gas to a predetermined pressure, and then sealing closed the open other end of the fuel rod while it is in the sealed chamber. Apparatus for welding closed the open end of a fuel rod while the rod is in a sealed chamber is disclosed in the U.S. Pat. Nos. 3,683,148 and 3,842,238 to Boyko et al. which are hereby incorporated by reference into this patent application. The enclosed pressurized gas helps prevent creep or collapse of the fuel rod, due to the pressure of the environment in which it is located during reactor operation, as is more fully explained in the U.S. Pat. No. 3,677,894, to Ferrari which is hereby incorporated by reference into this patent application.

With conventional gas enclosure techniques, a quantity of the fuel rod's residual atmosphere (including the moisture content therein) remains sealed within the fuel rod together with the introduced pressurized inert gas. This remaining residual atmosphere (including its moisture) can react with the interior of the fuel rod to degrade fuel performance, and even contribute to fuel rod cladding failure.

SUMMARY OF THE INVENTION

Briefly stated, the invention is directed towards a method for manufacturing a nuclear reactor fuel assembly including a method for enclosing a pressurized gas in the fuel assembly's fuel rods where the fuel rod's two ends are opened to the fuel rod's interior. One fuel rod end is hermetically enclosed in an airtight chamber. The residual atmosphere of the fuel rod's interior and that of the chamber is purged by introducing gas into the chamber. After purging, the fuel rod's second end is hermetically sealed against the flowing gas. The pressure of the gas in the fuel rod's interior is determined over time. The gas is continued to be introduced until it reaches the preselected pressure. Then the fuel rod's first end is hermetically sealed while it is in the chamber. The fuel rod with sealed ends is removed from the chamber.

In a preferred method, each fuel rod end is hermetically enclosed in a separate airtight chamber. The residual atmosphere of the fuel rod's interior and that of the two chambers is purged by introducing the gas into the first chamber and opening the second chamber. After purging, the second chamber is closed. The pressure of the gas in the fuel rod's interior is determined over time. The gas is continued to be introduced until it reaches the preselected pressure. Then each fuel rod end is hermetically sealed while it is in its separate chamber. The fuel rod with seal ends is removed from the chambers.

The invention is also directed towards a nuclear reactor fuel rod gas enclosing system where the fuel rod's two ends are open to the fuel rod's interior. The system includes two airtight chambers capable of hermetically removably enclosing the fuel rod's ends. There is included a gas supply into the first chamber, a second chamber opening and closing device, a pressure determiner for the gas in the fuel rod's interior, a fuel rod end sealer within each chamber, and a controller for regulating the gas supply, second chamber opening and closing device, and fuel rod end sealers in a predetermined manner.

BRIEF DESCRIPTION OF THE DRAWING

The subject matter of the invention is particularly pointed out and distinctly claimed in the concluding portion of this specification. The invention, however, both as to organization and method operation, together with further advantages thereof, may best be understood by reference to the following description taken in connection with the accompanying drawing in which:

The sole FIGURE is a schematic view, with parts shown in elevation and with parts broken away, of a nuclear reactor fuel rod and apparatus for enclosing a pressurized gas in such fuel rod.

DETAILED DESCRIPTION OF THE INVENTION

Referring now to the drawing, there is shown in the sole FIGURE a fuel rod 42, of a nuclear reactor fuel assembly, containing fuel pellets 44 and a spring 45 surrounded by cladding 43 between a first 46 and second 47 end cap. A first passageway 48 in the first end cap 46, and a second passageway 49 in the second end cap 47 lead from the interior of the fuel rod to outside the fuel rod. A small gap (on the order of 6 one-thousandths of an inch) exists between the fuel pellets 44 and the cladding 43 which allows for fuel pellet loading. A pressurized fluid introduced at the first passageway 48 would traverse the interior of the fuel rod 42 and exit from the second passageway 49 to the exterior of the fuel rod. Thus the two ends of the fuel rod are open to the fuel rod's interior.

The rest of the elements shown in the sole FIGURE represent a preferred embodiment for apparatus for carrying out a method for enclosing a gas at a preselected pressure in the fuel rod. A first airtight chamber 21 is adapted with a seal 26 to removably but hermetically enclose the first end cap 46, and a second airtight chamber 24 is adapted with a seal 27 to removably but hermetically enclose the second end cap 47. The fuel rod 42 may be held by supports 40 and 41 during the gas enclosing procedure.

There is provided means for hermetically introducing, and stopping the introduction of, the gas into the first chamber 21. Preferably such gas introduction and stopping means includes a gas supply 32 flowing into the first chamber 21 through an inlet pipe 31 with the gas flow controlled by an inlet valve (or pressure regulator) 33. Although any gas could be enclosed in the fuel rod, an inert gas is preferred (to eliminate reactions with the fuel and cladding), and helium would be a first choice (for better heat transfer characteristics).

Means are supplied for opening and hermetically closing the second chamber 24. Preferably such second chamber opening and closing means includes an outlet pipe 39 having one end communicating with the second chamber 24 and the other end equipped with an outlet valve 38.

Means are furnished for determining the pressure, over time, of the gas in the fuel rod interior. Preferably such pressure determining means includes a first pressure gauge 34 for the first chamber 21 and a second pressure gauge 37 for the second chamber 24, although just the first pressure gauge 34 could be used. Under steady state conditions the pressure in the fuel rod's interior would be equal to that in one or both of the chambers.

The invention also includes means for hermetically sealing one end (the first passageway 48 of the first end cap 46) of the fuel rod 42 while in the first chamber 21 and the other end (the second passageway 49 of the second end cap 47) of the fuel rod 42 while in the second chamber 24. Although such fuel rod end sealing means could have mechanical sealing such as crimping, metallurgical sealing such as welding is desired. Preferably such sealing means includes a first welding machine 29 (with power supply 50) having at least its welding tip 30 hermetically enclosed in the housing 22 of the first chamber 21 by a seal 25, and a second welding machine 36 (with a power supply 51) likewise having at least its welding tip 35 hermetically enclosed in the housing 23 of the second chamber 24 by a seal 28.

The invention also has means 52 for controlling the gas introduction and stopping means, the second chamber opening and closing means, and the fuel rod end sealing means all in a predetermined manner. Preferably such controller means includes automatic or computer control apparatus, known to those skilled in the art, to electrically operate the inlet valve 33, the outlet valve 38 and the welding machine power supplies 50 and 51 depending on the elapsed time and pressure gauge measurements in accordance with various methods of operation to be hereinafter described. The controller means could also include manual opening and closing of the inlet valve 33 and the outlet valve 38, and manual activation of the power supplies 50 and 51 for the welding, together with manual reading of a timer and the pressure gauges 34 and 37.

Optionally the invention can also include means for drawing and releasing a vacuum on the second chamber 24 together with the controller means 52 including means for controlling the vacuum drawing and releasing means in a prearranged manner. Preferably such vacuum means includes a vacuum pump 53 connected to an outlet valve 54 which communicates with the second chamber 24 in parallel with the outlet valve 38. Preferably such vacuum controlling means includes automatic or computer (or even manual) control, known to those skilled in the art, which will draw and release the vacuum on the second chamber depending on elapsed time in accordance with various methods of operation to be hereinafter discussed.

A first embodiment of the fuel rod gas enclosing method begins by hermetically enclosing only the fuel rod first end in the first airtight chamber 21. This can be done by keeping the outlet valve 38 in FIG. 1 always open, or equivalently by omitting the housing 23 and thereby omitting the second chamber 24, while retaining the second welding machine 36. The residual atmosphere in the fuel rod interior and in the first chamber 21 is purged by hermetically introducing the gas into the first chamber. This could be done by having the controller 52 open the inlet valve 33. The flowing gas will carry the residual atmosphere out the first chamber 21, through the first passageway 48 of the first end cap 46, through the interior of the fuel rod 42 past the gaps between the fuel pellets 44 and the cladding 43, and out through the second passageway 49 of the second end cap 47. After an elapsed time (previously experimentally determined) or when purging is otherwise determined to be completed the second end of the fuel rod is hermetically sealed against the gas still flowing through the fuel rod interior. This can be accomplished by having the controller 52 actuate the power supply 51 of the second welding machine 36. (The flow of gas could be momentarily slowed or stopped by the controller 52 to assist in the welding procedure.) Then the pressure of the gas in the fuel rod interior is determined over time. The gas is continued to be introduced into the first chamber as regulated by the controller 52 until the fuel rod interior pressure has generally reached the preselected value, such as when the pressure gauge 34 for the first chamber 21 is within a desired range of the preselected value for a desired time. At this point, optionally, the flow of gas could be stopped (or the first end of the fuel rod would have to be instantly sealed the moment the gas pressure reached the preselected value). When the controller 52 has received pressure determinations satisfying the criteria of the preselected value, it signals the power supply 50 to actuate the first welding machine 29 to hermetically seal the first end of the fuel rod while in the first chamber by welding closed the first passageway 48 in the first end cap 46. Finally the first end of the fuel rod is removed from the first chamber 21.

A preferred embodiment of the fuel rod gas enclosing method begins by hermetically enclosing the fuel rod's first end (with first end cap 46 and first passageway 48) in a first airtight chamber 21 and the fuel rod's second end (with second end cap 47 and second passageway 49) in a second airtight chamber 24. The residual atmosphere in the fuel rod interior and in both chambers is then purged by the controller 52 opening the inlet valve 33 to hermetically introduce the gas into the first chamber 21 and opening the outlet valve 38 of the second chamber 24 to exhaust the residual atmosphere therethrough. After purging is complete, the second chamber is hermetically closed, such as by having the controller 52 shut the outlet valves 38, and the fuel rod interior gas pressure is determined over time. Again, the completion of purging may be determined by the controller 52 through the lapse of a previously experimentally determined time, and the fuel rod interior pressure may be approximated by the readings of the pressure gauges 34 and 37 in the two chambers. Also after purging is complete, the controller 52 continues to supply gas into the first chamber 21 through the inlet valve 33 until the fuel rod interior pressure has generally reached the preselected value, such as when the controller 52 has received pressure determinations from the two pressure gauges 34 and 37 satisfying the criteria of the preselected value, such as when the two gauges show pressures within a desired range of the preselected value for a desired time. When the pressure has reached the preselected value, preferably the gas supply flowing into the first chamber 21 is stopped, such as by having the controller 52 shut the inlet valve 33. At this point the ends of the fuel rods are hermetically sealed while in their respective chambers. This can be accomplished by having the controller 52 actuate the power supplies 50 and 51 to the first 29 and second 36 welding machines to seal the first 48 and second 49 passageways of the first 46 and second 47 end caps, respectively. After the ends are sealed, the fuel rod is removed from the two chambers.

Optionally, the purging step in the above-described embodiment of the gas enclosing method could include drawing a vacuum on the open second chamber 24. This can be accomplished by having the controller, for the purging step, open (and close) the outlet valve 54 and actuate (and stop) the vacuum pump 53 in place of opening (and closing) the outlet valve 38.

Typical operating parameters include a five second purge followed by helium pressurization to about 350 psi at room temperature. The fuel rod end sealing is performed by TIG welding. The loading and unloading of the fuel rod ends into the two chambers may be accomplished automatically by appropriate rod handling machines to fully automate the gas enclosing process.

It will be apparent that many modifications and variations are possible in light of the above teachings. It, therefore, is to be understood that within the scope of the appended claims, the invention may be practiced other than as specifically described.

I claim:

1. A method for constructing a nuclear reactor fuel assembly having a fuel rod, including steps for enclosing a gas, at a preselected pressure, in said fuel rod, with said fuel rod having an interior and two ends open thereto, said gas enclosing steps comprising:
    (a) hermetically enclosing one of said ends of said fuel rod in an airtight chamber;
    (b) purging said fuel rod interior and said chamber of residual atmosphere by hermetically introducing said gas into said chamber, said residual atmosphere departing through the other of said ends of said fuel rod;
    (c) hermetically sealing said other end of said fuel rod against said gas, after said residual atmosphere has been purged;
    (d) determining the pressure, over time, of said gas in said fuel rod interior after said other end of said fuel rod has been hermetically sealed;
    (e) continuing to hermetically introduce said gas into said chamber, after said other end of said fuel rod has been hermetically sealed, until the pressure of said gas in said fuel rod interior has generally reached said preselected pressure;
    (f) hermetically sealing said one end of said fuel rod while in said chamber after the pressure of said gas in said fuel rod interior has generally reached said preselected pressure; and
    (g) removing said one end of said fuel rod from said chamber when said one end has been hermetically sealed.

2. A method for constructing a nuclear reactor fuel assembly having a fuel rod, including steps for enclosing a gas, at a preselected pressure, in said fuel rod, with said fuel rod having an interior and two ends open thereto, said gas enclosing steps comprising:
    (a) hermetically enclosing one of said ends of said fuel rod in a first airtight chamber and the other of said ends of said fuel rod in a second airtight chamber;
    (b) purging said fuel rod interior and said two chambers of residual atmosphere by hermetically introducing said gas into said first chamber, and opening said second chamber for exhausting said residual atmosphere therethrough;
    (c) hermetically closing the open said second chamber when said purging has been completed;
    (d) determining the pressure, over time, of said gas in said fuel rod interior after said purging has been completed;
    (e) continuing to hermetically introduce said gas into said first chamber, after said purging has been completed, until the pressure of said gas in said fuel rod interior has generally reached said preselected pressure;
    (f) hermetically sealing said one end of said fuel rod while in said first chamber and said other end of said fuel rod while in said second chamber after the pressure of said gas in said fuel rod interior has generally reached said preselected pressure; and
    (g) removing said one end of said fuel rod from said first chamber and said other end of said fuel rod from said second chamber when said ends have been hermetically sealed.

3. The method of claim 2, wherein said purging also includes drawing a vacuum on the open said second chamber.

4. The method of claim 2, wherein said determining the pressure of said gas in said fuel rod interior includes measuring the pressures of said gas in said first chamber and in the closed said second chamber.

5. The method of claim 2, also including stopping the introduction of said gas into said first chamber, before said hermetic sealing of said ends of said fuel rod, when the pressure of said gas in said fuel rod interior has generally reached said preselected pressure.

6. The method of claim 2, wherein said ends of said fuel rod include end caps having passageways communicating with said interior of said fuel rod and wherein said ends of said fuel rod are hermetically sealed by welding closed said passageways in said end caps.

* * * * *